(12) United States Patent
Klein

(10) Patent No.: US 11,057,689 B1
(45) Date of Patent: Jul. 6, 2021

(54) DOCKING STATION ACCESSORY DEVICE FOR CONNECTING ELECTRONIC MODULE DEVICES TO A PACKAGE

(71) Applicant: Elliot Klein, Aventura, FL (US)

(72) Inventor: Elliot Klein, Aventura, FL (US)

( * ) Notice: Subject to any disclaimer, the term of this patent is extended or adjusted under 35 U.S.C. 154(b) by 0 days.

(21) Appl. No.: 17/117,193

(22) Filed: Dec. 10, 2020

(51) Int. Cl.
| | |
|---|---|
| *G06Q 10/08* | (2012.01) |
| *H04Q 9/00* | (2006.01) |
| *G06K 19/06* | (2006.01) |
| *H04W 4/029* | (2018.01) |
| *H04W 4/80* | (2018.01) |

(52) U.S. Cl.
CPC ......... *H04Q 9/00* (2013.01); *G06K 19/06028* (2013.01); *G06K 19/06037* (2013.01); *G06Q 10/0833* (2013.01); *H04Q 2209/40* (2013.01); *H04W 4/029* (2018.02); *H04W 4/80* (2018.02)

(58) Field of Classification Search
CPC ............... H04Q 9/00; H04Q 2209/40; G06K 19/06037; G06K 19/06028; H04W 4/80; H04W 4/029; G06Q 10/0833
See application file for complete search history.

(56) References Cited

U.S. PATENT DOCUMENTS

| | | |
|---|---|---|
| 4,661,806 A | 4/1987 | Peters et al. |
| 4,896,029 A | 1/1990 | Chandler et al. |
| 4,922,516 A | 5/1990 | Butler et al. |
| 5,038,023 A | 8/1991 | Saliga |
| 5,122,959 A | 6/1992 | Nathanson et al. |
| 5,260,690 A | 11/1993 | Mann et al. |
| 5,298,731 A | 3/1994 | Ett |

(Continued)

FOREIGN PATENT DOCUMENTS

| | | |
|---|---|---|
| EP | 04941114 A | 7/1992 |
| GB | 2342208 A | 4/2000 |

(Continued)

OTHER PUBLICATIONS

Memphis Business Journal, FedEx introduces new SenseAware ID tracking technology, https://www.bizjournals.com/memphis/news/2020/09/15/fedex-introduces-senseaware-id.html, Sep. 15, 2020.

(Continued)

*Primary Examiner* — Hongmin Fan
(74) *Attorney, Agent, or Firm* — Philip E. Levy; Eckert Seamans Cherin & Mellott, LLC

(57) ABSTRACT

An accessory device as a positioning device configured for use in connection with a package in-process of being delivered, or being prepared for, staged for or in-transit of delivery are herein described. The accessory device comprises a docking station including a receptacle used to receive, carry or apply one or more small electronic communication device module(s) to monitor package location(s) or condition(s) by securing electronic module(s) within the accessory device as a docking station to then be added and associated by computer-implemented systems with a package for wireless location and condition monitoring. The accessory device may include one or more retaining compartment features designed to hold or carry short-range radio module(s), serving as positioning device with monitoring module(s), coupled into the retaining feature receptacle(s).

21 Claims, 6 Drawing Sheets

(56) References Cited

U.S. PATENT DOCUMENTS

| | | |
|---|---|---|
| 5,363,425 A | 11/1994 | Mufti et al. |
| 5,513,111 A | 4/1996 | Wortham |
| 5,528,518 A | 6/1996 | Bradshaw et al. |
| 5,561,446 A | 10/1996 | Monlick |
| 5,589,835 A | 12/1996 | Gildea et al. |
| 5,636,425 A | 6/1997 | Best |
| 5,664,113 A | 9/1997 | Worger et al. |
| 5,671,362 A | 9/1997 | Cowe et al. |
| 5,682,142 A | 10/1997 | Loosmore et al. |
| 5,708,423 A | 1/1998 | Ghaffari et al. |
| 5,712,789 A | 1/1998 | Radican |
| 5,715,905 A | 2/1998 | Kaman |
| 5,724,243 A | 3/1998 | Westerlage et al. |
| 5,777,884 A | 7/1998 | Belka et al. |
| 5,804,802 A | 9/1998 | Card et al. |
| 5,857,201 A | 1/1999 | Wright, Jr. et al. |
| 5,880,958 A | 3/1999 | Helms et al. |
| 5,886,634 A | 3/1999 | Muhme |
| 5,920,846 A | 7/1999 | Storch et al. |
| 5,963,134 A | 10/1999 | Bowers et al. |
| 6,012,041 A | 1/2000 | Brewer et al. |
| 6,061,607 A | 5/2000 | Bradley et al. |
| 6,061,689 A | 5/2000 | Chang et al. |
| 6,064,642 A | 5/2000 | Okubo |
| 6,065,120 A | 5/2000 | Laursen et al. |
| 6,073,062 A | 6/2000 | Hoshino et al. |
| 6,075,441 A | 6/2000 | Maloney |
| 6,083,353 A | 7/2000 | Alexander, Jr. |
| 6,094,642 A | 7/2000 | Stephenson et al. |
| 6,102,162 A | 8/2000 | Teicher |
| 6,131,116 A | 10/2000 | Riggins et al. |
| 6,148,261 A | 11/2000 | Obradovich et al. |
| 6,169,483 B1 | 1/2001 | Ghaffari et al. |
| 6,216,158 B1 | 4/2001 | Luo et al. |
| 6,259,367 B1 | 7/2001 | Klein |
| 6,272,457 B1 | 8/2001 | Ford et al. |
| 6,285,916 B1 | 9/2001 | Kadaba et al. |
| 6,289,260 B1 | 9/2001 | Bradley et al. |
| 6,292,181 B1 | 9/2001 | Banerjee et al. |
| 6,300,872 B1 | 10/2001 | Mathias et al. |
| 6,300,873 B1 | 10/2001 | Kucharczyk et al. |
| 6,321,158 B1 | 11/2001 | Delorme et al. |
| 6,439,345 B1 | 8/2002 | Rectenwald et al. |
| 6,456,239 B1 | 9/2002 | Werb et al. |
| 6,509,828 B2 | 1/2003 | Bolavage et al. |
| 6,553,375 B1 | 4/2003 | Huang et al. |
| 6,587,835 B1 | 7/2003 | Treyz et al. |
| 6,609,090 B1 | 8/2003 | Hickman et al. |
| 6,625,454 B1 | 9/2003 | Rappaport et al. |
| 6,633,900 B1 | 10/2003 | Khalessi et al. |
| 6,671,757 B1 | 12/2003 | Multer et al. |
| 6,748,318 B1 | 6/2004 | Jones |
| 6,909,356 B2 | 6/2005 | Brown et al. |
| 6,947,976 B1 | 9/2005 | Devitt et al. |
| 6,952,645 B1 | 10/2005 | Jones |
| 6,965,866 B2 | 11/2005 | Klein |
| 6,971,063 B1 | 11/2005 | Rappaport et al. |
| 6,993,592 B2 | 1/2006 | Krumm et al. |
| 7,012,529 B2 | 3/2006 | Sajkowsky |
| 7,020,701 B1 | 3/2006 | Gelvin et al. |
| 7,103,886 B2 | 9/2006 | Haller et al. |
| 7,113,099 B2 | 9/2006 | Tyroler et al. |
| 7,136,832 B2 | 11/2006 | Li et al. |
| 7,191,392 B1 | 3/2007 | Coar |
| 7,209,771 B2 | 4/2007 | Twitchell, Jr. |
| 7,230,539 B2 | 6/2007 | Klein |
| 7,312,752 B2 | 12/2007 | Smith et al. |
| 7,623,033 B2 | 11/2009 | Ainsworth et al. |
| 7,735,732 B2 | 6/2010 | Linton et al. |
| 7,761,347 B2 | 7/2010 | Fujisawa et al. |
| 7,844,505 B1 | 11/2010 | Arneson et al. |
| 8,090,351 B2 | 1/2012 | Klein |
| 8,321,302 B2 | 11/2012 | Bauer et al. |
| 8,438,084 B1 | 5/2013 | Tesler et al. |
| 8,494,581 B2 | 7/2013 | Barbosa et al. |
| 8,700,003 B2 | 4/2014 | Klein |
| 8,766,797 B2 | 7/2014 | Hamm et al. |
| 8,965,412 B2 | 2/2015 | Alizadeh-Shabdiz et al. |
| 9,020,536 B1 | 4/2015 | Crossno et al. |
| 9,047,586 B2 | 6/2015 | Melick et al. |
| 9,107,046 B2 | 8/2015 | Putman |
| 9,182,231 B2 | 11/2015 | Skaaksrud |
| 9,267,812 B1 | 2/2016 | Sachdev |
| 9,279,683 B2 | 3/2016 | Turon et al. |
| 9,349,270 B1 | 5/2016 | Crossno |
| 9,432,500 B2 | 8/2016 | Putman |
| 9,439,164 B2 | 9/2016 | Stewart et al. |
| 9,460,412 B2 | 10/2016 | Gates et al. |
| 9,547,079 B2 | 1/2017 | Hyatt et al. |
| 9,609,484 B1 | 3/2017 | Rodoper |
| 9,974,042 B2 | 5/2018 | Skaaksrud |
| 10,037,508 B1 | 7/2018 | Rusnak et al. |
| 10,217,078 B1 | 2/2019 | Klein |
| 10,305,744 B2 | 5/2019 | Skaaksrud et al. |
| 10,313,199 B2 | 6/2019 | Skaaksrud et al. |
| 10,579,974 B1 | 3/2020 | Lester |
| 10,686,483 B2 | 6/2020 | Griffin, II et al. |
| 10,762,465 B2 | 9/2020 | Skaaksrud |
| 10,856,116 B1 | 12/2020 | Klein |
| 10,904,722 B2 | 1/2021 | Klein |
| 2001/0051905 A1 | 12/2001 | Lucas |
| 2002/0065728 A1 | 5/2002 | Ogasawara |
| 2003/0177025 A1 | 9/2003 | Curkendall et al. |
| 2004/0239523 A1 | 12/2004 | Paoli et al. |
| 2005/0108044 A1 | 5/2005 | Koster |
| 2006/0049250 A1 | 3/2006 | Sullivan |
| 2007/0050305 A1 | 3/2007 | Klein |
| 2011/0027401 A1 | 2/2011 | Schnee |
| 2011/0037248 A1 | 2/2011 | Howland |
| 2011/0053559 A1 | 3/2011 | Klein |
| 2011/0054979 A1 | 3/2011 | Cova et al. |
| 2012/0164982 A1 | 6/2012 | Klein |
| 2013/0331124 A1 | 12/2013 | Rieger, III |
| 2014/0024419 A1* | 1/2014 | Norris ............... G08B 5/223 455/575.8 |
| 2014/0224884 A1* | 8/2014 | Liu ............... G06K 19/0773 235/492 |
| 2015/0161697 A1 | 6/2015 | Jones et al. |
| 2015/0271046 A1 | 9/2015 | Clubb et al. |
| 2015/0373487 A1* | 12/2015 | Miller ............... H04W 4/02 455/456.1 |
| 2016/0042317 A1 | 2/2016 | Goodman et al. |
| 2016/0205500 A1 | 7/2016 | Lee et al. |
| 2016/0302039 A1 | 10/2016 | Culpepper et al. |
| 2016/0381211 A1 | 12/2016 | Putman |
| 2018/0349485 A1 | 12/2018 | Klein |
| 2019/0012637 A1 | 1/2019 | Gillen |
| 2019/0019144 A1 | 1/2019 | Gillen |
| 2019/0050806 A1 | 2/2019 | Klein |
| 2019/0181905 A1 | 6/2019 | Griffin, II et al. |
| 2020/0034457 A1 | 1/2020 | Brody et al. |
| 2020/0051015 A1* | 2/2020 | Davis ............... G06Q 10/0833 |
| 2020/0288284 A1 | 9/2020 | Klein |
| 2020/0404468 A1 | 12/2020 | Klein |
| 2020/0410446 A1* | 12/2020 | Rahilly ............... H04W 4/80 |
| 2021/0014653 A1 | 1/2021 | Klein |
| 2021/0037357 A1 | 2/2021 | Klein |

FOREIGN PATENT DOCUMENTS

| | | |
|---|---|---|
| WO | WO 8905549 A1 | 6/1989 |
| WO | WO 9627171 | 9/1996 |
| WO | WO 9964974 | 12/1999 |

OTHER PUBLICATIONS

International Search Report and Written Opinion of the International Searching Authority for PCT/US2019/054598, dated Oct. 31, 2019.

"Wiliot Product Overview," 13 pages, available at: https://www.wiliot.com/product-overview: Last Accessed Feb. 28, 2021.

(56) References Cited

OTHER PUBLICATIONS

Who Can Find My Devices? Security and Privacy of Apple's Crowd-Sourced Bluetooth Location Tracking System, Heinrich, Alexander, et al., Cornell University, New York USA, Published Mar. 3, 2021, Available at: https://arxiv.org/abs/2103.02282 , Last Accessed Mar. 8, 2021.

* cited by examiner

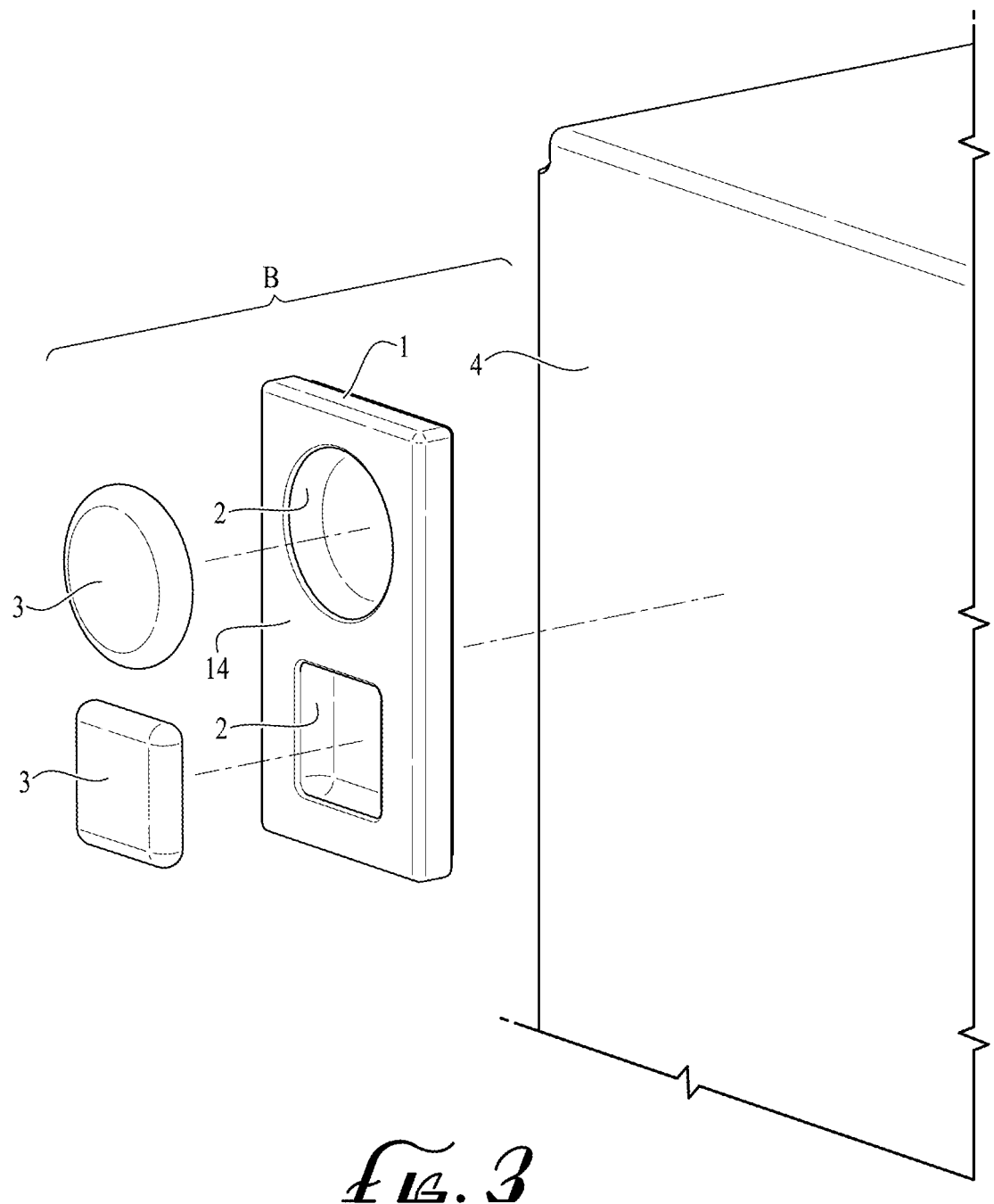

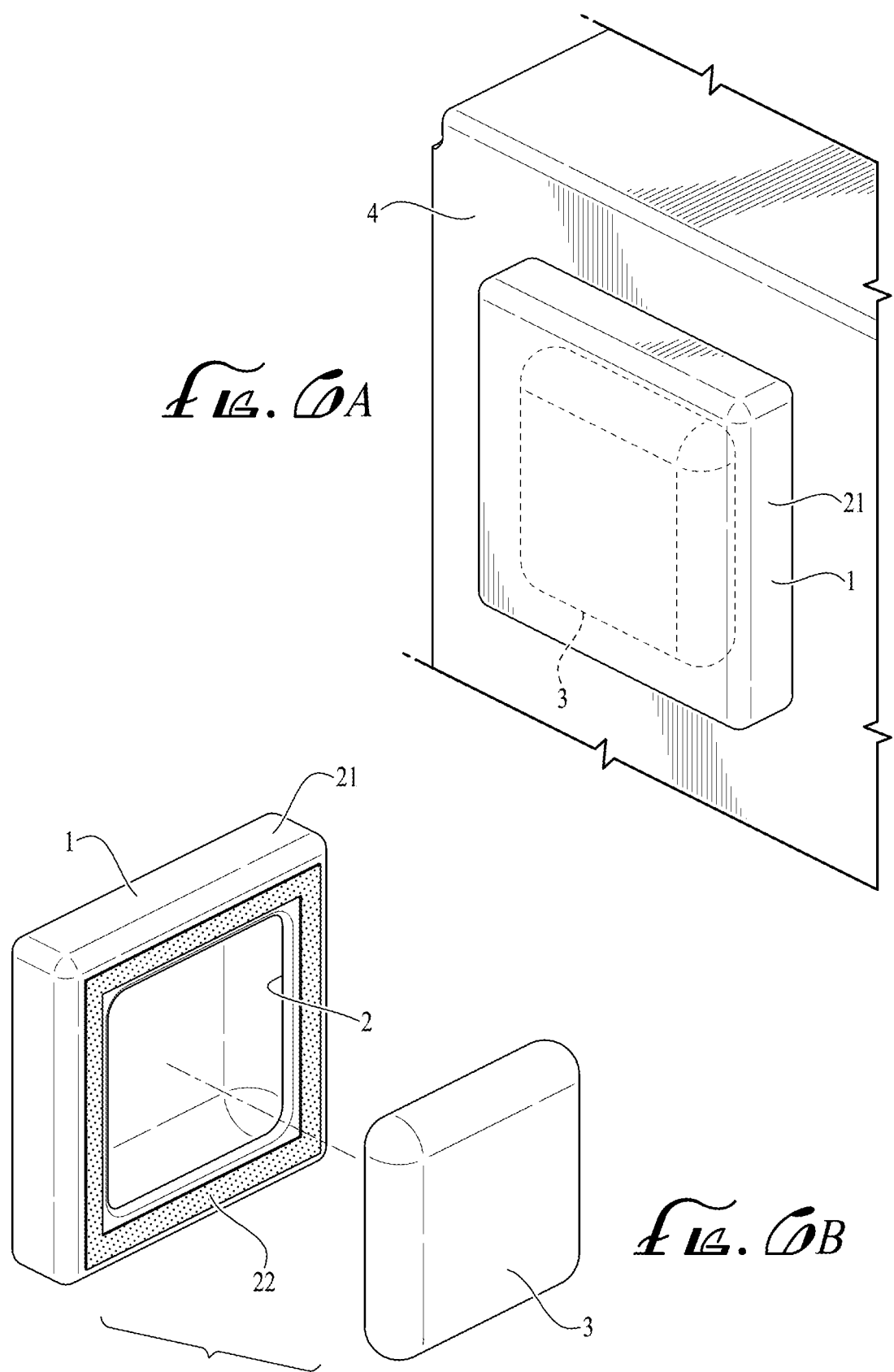

DOCKING STATION ACCESSORY DEVICE FOR CONNECTING ELECTRONIC MODULE DEVICES TO A PACKAGE

BACKGROUND OF THE INVENTION

1. Field of the Invention

The described embodiments relate to an accessory device structured to be attached to packages that includes a housing member for holding exchangeable wireless radio modules and/or additional electronic monitoring module(s) for the transmission of digital information relating to packages as a positioning device for such packages. In particular, the described embodiments relate to an accessory device with a housing member and frame member having a retaining feature as a docking station designed to retain electronic communication modules within the positioning device for multiprotocol wireless location tracking and monitoring as part of separate computer implemented package monitoring systems and methods.

2. Description of the Related Art

In shipping applications, small wireless devices, such as radio modules (e.g., a Bluetooth, Ultra-wideband, and/or other short-range radio transmission module), temperature monitoring devices, with or without barcodes such as QR codes, near field communication (NFC) radio modules, and/or visual display screens, are often used for package attachable shipment monitoring as part of computer implemented package monitoring or related logistics system with separate package location systems and methods. Such devices, however, are currently typically delivered to shipping parties as separate individual component modules provided by one or more manufacturers with generally no means to include, organize or efficiently combine such devices into a single accessory device for package attachable shipment monitoring.

SUMMARY OF THE INVENTION

In one aspect, an accessory device suitable for attaching an electronic radio module to a package for use in connection with a package in-process of being, delivered, stored, or being prepared for, staged for or in-transit is described. The accessory device may include a protective housing member covering to retain and dock the module(s) that defines a size and a shape corresponding to the module device. Also, the housing member may include a recessed region. The accessory device may further include an outer layer covering an exterior region of the housing member. The accessory device may further include an inner layer covering an interior region of the housing member and disposed in a recessed region, the inner layer comprising an opening in a housing member location corresponding to the recessed region to accept module(s). The accessory device may further include a retaining feature disposed in the recessed region, in which the retaining feature extends away from the housing member to receive one or more module(s).

The accessory device allows for commercial implementation as part of a computer-implemented system to manage air-ground package location visibility paired by hardware agnostic monitoring of the module(s) in an accessory device, to verify real-time transport locations, with technology enablers for collaborative monitoring of packages as a service for common carriers or individual shipping parties as more fully detailed in system and methods of U.S. patent application Ser. No. 17/036,389, filed Sep. 29, 2020, entitled "BLOCKCHAIN SYSTEM AND METHOD FOR CALCULATING LOCATION OF TIME-CRUCIAL SHIPMENTS ACCORDING TO EXPECTATION AND SMART CONTRACTS."

The accessory device of the disclosed concept improves upon the prior art by providing a novel means to integrate, combine and unite multiple electronic module(s) applied on or into a package using at least two short-range communication modules, so one or more module(s) can communicate to remote wireless devices in proximity range of the accessory device, and to interface modules with mobile device applications, APIs and remote computer systems for improved wireless monitoring of a package for shipment.

The accessory device of the disclosed concept works with systems and methods for collaboration across chain-of custody and can add database integrations with multi enterprise systems and sources for digital monitoring between the electronic device(s) docked within and tracking or monitoring computer systems with proactive alerting to create improved package logistics monitoring to monitor the location of packages, building resilience to the disruptions and problems with logistics. The module(s) can be associated with such computer-implemented systems by interfacing with a mobile phone or other communication devices in range of accessory device or module(s).

As defined, a package is a bundle of something, that is packed and wrapped or boxed. It can represent a stand-alone parcel or a container (e.g., with dry ice, or liquid nitrogen storage units that can keep their contents at low temperatures for as long as 10 days), such as a box or case, in which something is or may be packed for goods, freight, or logistics transport. It can also be a finished product contained in a unit that is suitable for immediate installation and operation, as an aircraft or other critical replacement part, and can also include items for medical and pharmaceutical transport.

The on-package monitoring modules of the disclosed concept are placed into an accessory device and can then combine with mobile device apps, databases and enterprise systems to prevent logistics problems by reading wireless signals from Bluetooth and/or other short-range modules in range of the package to automatically monitor shipment location(s) and conditions for multiple business cases.

The monitoring modules of the disclosed concept can transmit unique radio module identifying data and/or communicate location by exchanging signal data to be evaluated in mobile devices or remote cloud computing systems. Data is then reported in package tracking systems and/or compared to expected location(s) by computer notifications to reduce risks. This adds predictability for logistics partners to combine data from shipment IoT endpoints with real-time server/cloud data that may affect last-mile ETA delivery expectations or can assist in monitoring or locating a package.

Supply chain participants can rely on the package-attachable and collaborative electronic module accessory device of the disclosed concept to monitor package(s) by combining and pairing module reported data with outside third party public or intermodal data sources including: port, truck, aircraft flight arrival/departure data, ERP, TMS or other databases for analytics that proactively trigger notice to deviations to forewarn, re-route, prevent delay, or apply AI to correct by integrating with remote computers, mobile device applications and/or cloud computing systems.

There are additional benefits the accessory device of the disclosed concept as a docking station brings to supply chain package shipments especially in healthcare where packages, including vaccines, therapeutics, PPE shipments, and high-value goods must be monitored for regulatory compliance and/or kept viable following long periods in transit and monitored with a chain-of-custody record.

Having the capability to attach an accessory device with more than one module(s) comprising, for example and without limitation, at least a Bluetooth and/or Ultra-wideband radio module to the accessory device inside of a package further provides a means to covertly maintain the position device hidden and out of view to more securely monitor a high-value or time-crucial package's location(s). It also provides a means for a position accessory device to be adhered to the inside surface of a package to improve monitoring of wireless signal(s) data for the transmission of digital information according to the short-range sensitivity of the radio module(s), compared to other prior art that does not teach such advantages or improvements for specific use of a docking station as a positioning device for packages in-process of being delivered, stored, or being prepared for, staged for, or in-transit of delivery together with the separate computer implemented systems and methods for package monitoring.

A docking station accessory device of the disclosed concept enables improved attachment means to electronically associate or link together multiple modules to a package as part of remote computer systems. The positioning device and radio module(s) transmission signals may be improved, for example, by adhesive layer means for placement adjacent to package walls to reduce interference and improve short-range communication-enabled device transmission signal range of the radio module(s).

Short-range radio module(s) add real-time or near-real time monitoring by connected hardware module(s) and communication devices (e.g., mobile phone or tablet devices) nearby or in proximity range of the device(s) of the disclosed concept to capture and share critical information about location(s) can enable smarter, safer real time decisions that ensure medical products and vaccines get to their intended destination, on time, and in perfect condition, or in compliance with regulatory rules. Further, Ultra-wideband radio modules add spatial location awareness, with the ability for a mobile phone or other communication device in-range to recognize its surroundings and the package(s) in it. This aspect of the disclosed concept therefore adds advantage and novelty for enclosed location monitoring areas, including for example: a specific airport, terminal floor, warehouse, truck, loading, or other zone. Similar use cases also apply electronic airline baggage tag or cold-chain monitoring markets (i.e., fresh foods and agricultural packaged goods), where reported data from modules in the accessory device of the disclosed concept may be incorporated into common carrier, airport and/or cold-chain enterprise applications for package monitoring by mobile apps or enterprise systems. Such applications can function with internet connected gateway devices in transmission range of accessory devices (e.g., a Bluetooth gateway in courier delivery vehicle or warehouse), and/or 5G wireless protocols to further improve monitoring by transmission of the monitoring data in real-time or near real-time.

An additional advantage of at least two radio modules in the accessory device of the disclosed concept is that such second radio module with Ultra-wideband, by example, is more accurate for location than Bluetooth and can measure distances to within centimeters, and provide for direction or location within a certain proximity or orientation relative to package indoors with remote mobile communication devices (e.g., smartphone).

A temperature data logger and/or monitor may also be integrated as one of the accessory device's retained modules that may, by example, be required for a package with vaccine shipments. These can be small electronic devices that contain an internal thermometer, and/or with a thermocouple temperature probe extension cable, to record temperature readings from inside package contents, over a defined period of time for package temperature readings and are especially beneficial in cold-chain monitoring to confirm efficacy of packaged products. Having an accessory device with an additional sensor connected to a module by an optional extension cable offers advantages for placing only the temperature monitor inside the package, such that the device can monitor internal temperatures, despite remaining outside the package, which is useful for cold chain and vaccine packages.

Such data logger devices are manufactured by firms such as Parsyl™, Logmore™ or others, and may feature an electronically updateable LCD or e-paper display technology screen on their front side area featuring an electronically changeable QR code, bar code or indicia pattern on the device front side to then be read by scan using a mobile communication device with a camera and/or other optical scanning devices to report monitored in-transit condition data to include: location, temperature, humidity, light and shocks from reading the scan, wireless data, and/or electronically recorded data.

Other data transmission and wireless systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

FIG. 3 is an exploded perspective view that illustrates the accessory device of FIG. 1 including a housing and member frame having a radio modules in circular disc and square shapes, combining two different electronic modules for the positioning device;

FIGS. 6A-B illustrate front and rear perspective view of another embodiment of an accessory device according to the disclosed concept where a positioning device may be placed hidden from view when placed onto a package, with the module docked against the rear and sidewalls of the device or inserted from the back side where front side is fully covered to hide the module;

Figure 1:
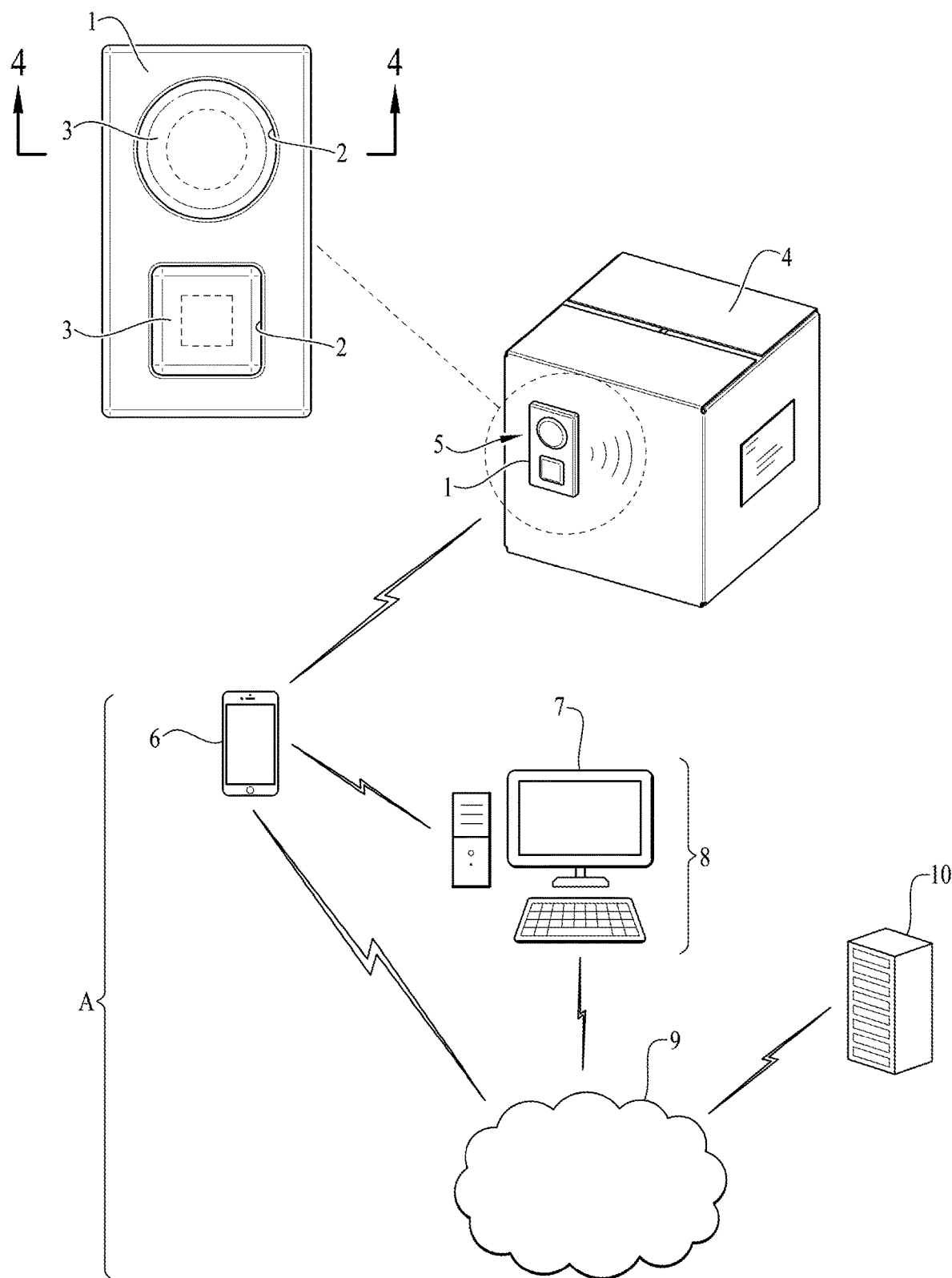
FIG. 1 is a schematic view showing an exemplary embodiment of an accessory device with two separate modules being combined and held in retaining feature(s), and shown disposed onto the outside of a package with adhesive means to monitor the package by separate remote computer implemented systems comprising one or more of: a mobile communications device, remote computer system, database(s), computer server and/or cloud computing systems.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the disclosed concept described herein.

DETAILED DESCRIPTION OF THE INVENTION

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments. The disclosure will be readily understood by the following detailed description in conjunction with the accompanying drawings, wherein like reference numerals designate like structural elements.

Technology advancements in the transmission of digital information and geospatial positioning, combined with the emergence of multiple low-power radio modules as data sensors, are giving rise to novel ways to combine and apply more than one radio module(s) to a package to improve package monitoring with the use of multiple short-range communication radio module technologies, thereby opening new ways to select and combine them according to specific package monitoring needs. The disclosed concept, described in greater detail herein, enables at least two disparate wireless module(s) to be inserted into an accessory device with their selection being dependent on the type and/or monitoring purpose(s) of a package shipment. For instance, when it comes to shipping pharmaceuticals and medicine, precise considerations need to be taken into account. For example, if the package contains a Covid-19 vaccine, it may require temperature storage at minus 90 degrees Fahrenheit and therefore, an appropriate electronic temperature module can be inserted into the accessory device with such package that is capable of recording or monitoring such low temperature ranges. Moreover, the addition of separate multiprotocol radio module(s) to obtain or monitor indoor/outdoor geographic location(s) within module(s) in the accessory device to add package location monitoring with wireless means to obtain and report location(s) and chain of custody in-transit. Further, shipments of a vaccine can be adapted with an accessory device to have sensors to monitor both the temperature and location of the vaccine across their pre-set routes, leveraging broad distribution networks so deviation can be reported.

There may be other time-crucial packages containing, for example, drug, blood or human tissue where monitoring location is critical in order to know ETA at a hospital, pharmacy or other facility. In such a circumstance, different sensor module(s) can be selected for the disclosed concept that monitor temperature only in more standard cold-chain refrigeration zone ranges, and that further combine with a second radio best suited for indoor location monitoring in a hospital facility. Module selection also relates to managing commercial deployment cost, as more basic modules such as standard cold-chain temperature modules are likely to be lower cost compared to those measuring and monitoring at minus 90 F. Requirements for selecting different module(s) may also involve packages intended for international destinations where radio module selection for carrying in the accessory device may need to be one larger in size for extended range beacons or with an alternative type or size battery with capacity to retain device wireless transmission power for package location monitoring over much longer periods of travel time.

Other companion modules capable of location monitoring of indoor locations (i.e., a package within a lab room or hospital floor) could be selected for a package positioning device to monitor or find it within the indoor facility via tracking or related monitoring systems. For example, the accessory device of the disclosed concept can assist with adding radio module(s) such as Ultra-wideband (a fast, secure and low power, short-range communication-enabled radio transmission protocol) as one radio module(s), in combination with other radio module(s) that can better assist in locating a package within a factory or warehouse while being staged or stored. For example, for a pending shipment such as a spare part for an airplane on the ground, where it is often time-crucial to be able to locate, identify and find such part, it would be beneficial to use modules for location positioning including Bluetooth and/or Ultra-wideband, or others known in the art. An Ultra-wideband module can add advantages to further provide visual and position location with augmented reality (AR) guidance and improves accuracy over Bluetooth location reporting alone.

Use of a positioning device with radio module(s) in the form of module(s) attached to packages by an accessory device as described herein in various embodiments helps connect positioning device reported data to enterprise application(s) and/or communication devices and system(s) to determine and communicate by machine notification interface with enhanced location and visibility for safety, security and package-specific condition monitoring. The radio module(s) include an antenna that emits wireless signal data detectable and determined by another electronic device such as a smartphone or other communication devices to obtain location(s) data. Connectivity with wireless multiprotocol further allows multiple short-range communication-enabled modules to be active at the same time for monitoring.

Such a positioning device as utilized in the disclosed concept can utilize Bluetooth modules and/or other modules in combination to communicate with Wi-Fi access points, mesh networks, mobile communication devices, databases, and/or internet connected gateway access points that then connect to separate computer implemented systems and methods for enhanced package monitoring and reporting.

Moreover, packages often move through a very fragmented supply and distribution chain where there is not a universal set of wireless infrastructure for location monitoring. Some facilities or indoor/outdoor locations may have access to Wi-Fi access points, while others only have access to Bluetooth or 5G wireless network connectivity. In such cases, geographic location(s) are generally obtained and reported from remote mobile device(s) and determined based on location signal data of a Wi-Fi network, Bluetooth network, Ultra-wideband reference anchor points, a mobile carrier(s)' network elements, or a combination thereof, under separate computer-implemented systems.

Therefore, having multiple modules docked in a positioning device as described herein in connection with the disclosed concept that are dependent on the package delivery requirements (i.e., a time-crucial delivery expectation or cold-chain temperature range), destination and/or routing (e.g., international package shipment) can be beneficial. Specifically, the multiple modules in the accessory device as described herein provide at least two different radio modules to layer multiple radio module technologies, essentially moving with and better able to monitor a package and its location(s), particularly when in-transit or inside common carrier delivery hubs.

The disclosed concept, described in greater detail herein, helps solve the problem of including and combining one or more disparate package monitoring module(s) in a positioning device by enabling a re-usable docking station means to dispose electronic module(s) for the transmission of digital information onto or with a package in a form factor and materials suitable to protect the module(s) from physical damage during transit, and to allow for the capability to arrange dual module adjacency of different monitoring modules. The disclosed concept further includes the capability to insert and remove one or more radio module(s) for single-journey or to reuse the accessory device for multiple shipments by a form factor that comprises one or more of a flexible plastic, paper, cardboard, polymer, elastomeric and/or silicone material with a stiffness and flexibility enabling the module(s) to be readily secured within, added to or removed from the accessory device to re-charge, reset, exchange or otherwise link the one or more module(s) to the package in the positioning device for single or multiple package monitoring journeys with related monitoring services as part of separate computer-implemented system(s).

FIG. 1 illustrates a schematic view of an accessory device 1 according to an exemplary embodiment of the disclosed concept that may serve as a positioning device on a package 4. The accessory device 1 shown in FIG. 1 includes two separate electronic modules 3 being combined and each held in a retaining feature 2 (e.g., a wall with a retaining lip) formed as part of a housing member of accessory device 1. FIG. 1 shows accessory device 1 disposed onto the outside 5 of package 4 by adhesive means. FIG. 1 further illustrates that accessory device 1 may be used to monitor package 4 by separate and independent computer implemented systems (shown collectively as A in FIG. 1) comprising one or more of: a mobile communications device 6, such as a smartphone or a tablet, an internet connected remote computer device 7 comprising a wireless gateway and/or computer system 8 with access to database(s) and/or APIs, a computer server 10 and/or a cloud system 9. The illustrated systems allow the association of modules 3 with package 4 to then enable communication with a remote computer to monitor and/or determine and report package 4's location(s) and/or condition, on-demand in real-time or near real-time, and/or when a package exception event occurs. The accessory device 1 contains one or more positioning devices capable of transmitting digital signals via short-range communication modules comprising one or more of modules 3 with location monitoring or recording technologies. The accessory device 1 can then be added on a package 4 or placed, in product packaging and in shipping containers, for the purpose of providing information to customers of a common carrier and/or delivery service by computer server 10 and/or cloud systems 9 about the location of package 4, potentially adding additional monitoring reporting for such conditions as temperature. Module(s) 3 may then communicate with a neighboring or companion mobile device 6 or cloud computer systems 9 with wireless gateways to share, determine, display and/or update a location of the accessory device 1 with package 4. The short-range communication-enabled module(s) comprising one or more of modules 3 may be of various radio module protocols, including, but not limited to, Bluetooth, Ultra-wideband, Wi-Fi, and/or one or more proprietary communication protocols.

Figure 2A:
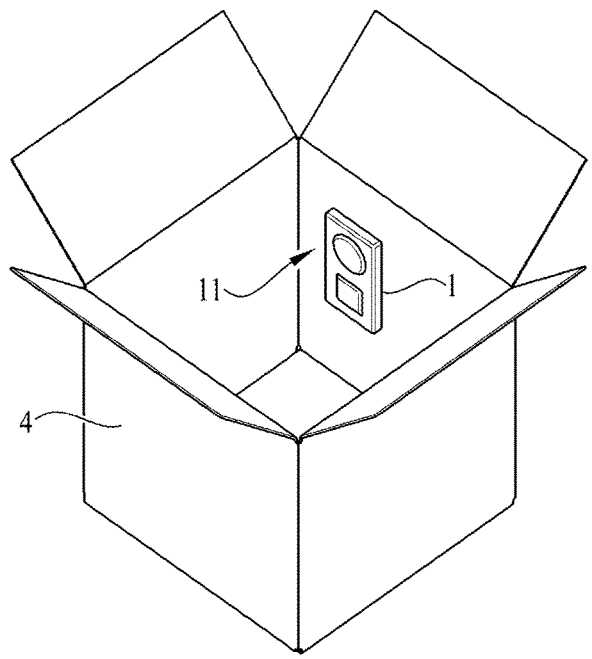
FIGS. 2A-B illustrate embodiments showing the accessory device of FIG. 1 when placed inside areas of a package(s) by adhesive means and inside the package container contents, respectively.
Figure 2B:
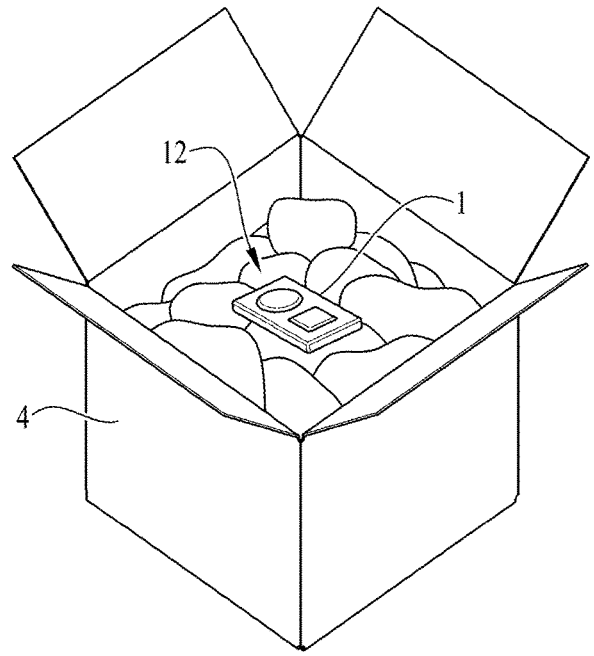
Figure 2C:
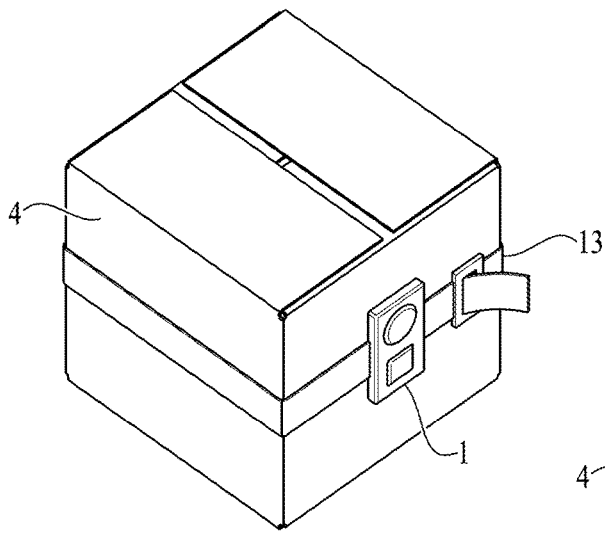
FIGS. 2C-D illustrate alternative attachment embodiments with a strap or loop to secure the accessory device to the outside of a package by connector strap or loop attachment, respectively.
Figure 2D:
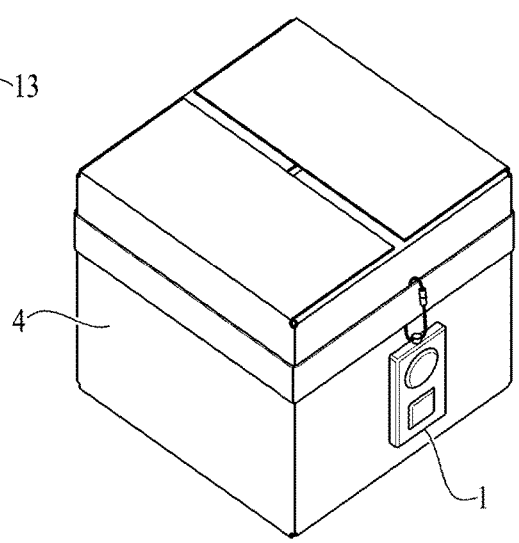

FIGS. 2A-D illustrate example perspective views of accessory device 1. FIG. 2A shows accessory device 1 for use in connection with a package 4 showing the accessory device 1 adapted for being attached to the inside of a package wall surface 11, and in FIG. 2B adapted to be placed within package contents 12, that may include a vaccine or pharmaceutical package separately packed inside an inner carton or container (e.g., dry ice and vaccine included therein the inner carton) that is in-process of being delivered, stored, or being prepared for or staged for delivery. As such, accessory device 1 is included for location monitoring by the radio module(s) comprising one or more of modules 3 in order to protect against lost, stolen, delayed or missing packages and/or impotent rendering temperature condition(s). FIG. 2C illustrates an alternative attachment embodiment where accessory device 1 is attached to package 4 in the form of a wrapped crate, pallet, or container by inserting a flexible attachment strap 13 through a small opening in the housing member of accessory device 1 to attach accessory device 1 to package 4. FIG. 2D shows another alternate attachment of accessory device 1 to package 4 by a connector loop and/or clip on connector inserted between an opening hole region in the housing member of accessory device 1 for attachment of accessory device 1 to package 4 as shown.

FIG. 3 shows accessory device 1 in perspective view as a positioning device with the housing member (in the form of exemplary frame member 14) retaining an exchangeable disc shaped radio module 3 and an exchangeable square shaped module 3 (each comprising two or more radio modules as described herein in the exemplary embodiment) in the form of a temperature condition monitoring module and/or a second radio module, both placeable by hand into retaining feature 2 deposed in and/or partially defining an internal volume of the frame member 14 and partially covering the positioning device comprising the modules 3 as means to carry the positioning device comprising the modules 3. The accessory device 1 has a size and shape to receive and carry each of the module(s) 3. Furthermore, accessory device 1 may be made of a silicone, polymer, elastomeric, paper, cardboard, or plastic material, or a combination thereof, with a flexible stiffness for attachment to package 4 by such flexible material form factor to permit the physical hand insertion, retention and/or removal of modules (indicated by B in FIG. 3) in accessory device 1. As described herein, accessory device 1 is further adapted for being attached to, adhered to or placed within package(s) 4, in accordance with the described embodiments.

Figure 4:
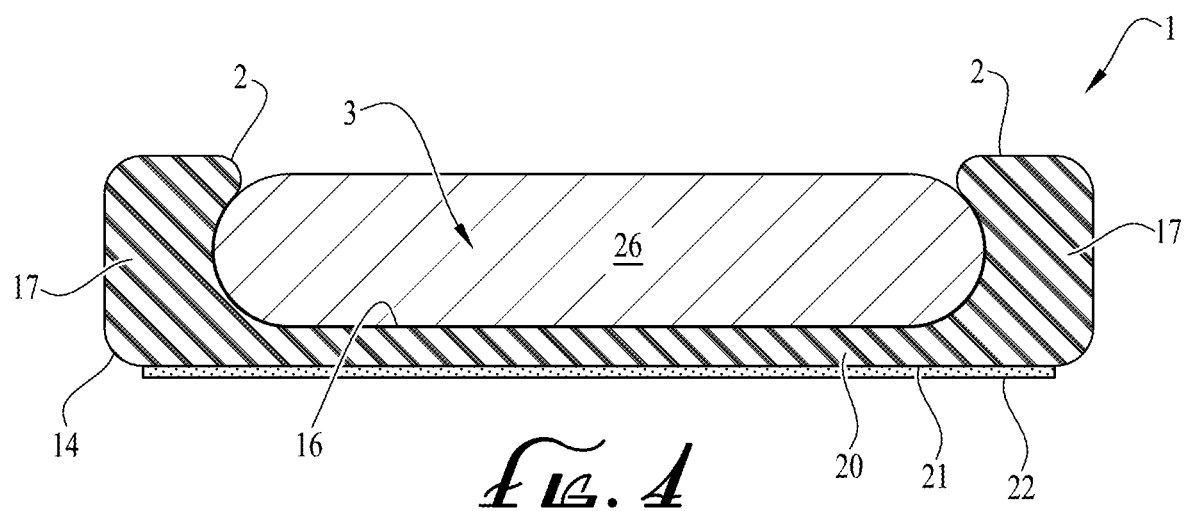
FIG. 4 illustrates a cross sectional view of the accessory device shown in FIG. 1, with the accessory device enlarged to show the retaining feature, the recessed region, and additional features holding module(s) against the rear and sidewalls of device.

FIG. 4 is a cross sectional view of accessory device 1, taken along line 4-4 of FIG. 1, with a positioning device comprising radio module 3 inside frame member 14 showing a view of the device with the accessory device 1 enlarged to show the retaining feature 2. In the exemplary embodiment, the positioning device comprising radio module 3 includes at least two wireless radio module(s) structured and configured to obtain and/or monitor an indoor and/or outdoor geographic location and/or a temperature condition of the package 4 for use in connection with the package when the package 4 is in-process of being delivered, stored, or being prepared for, staged for, or in-transit of delivery. As seen in FIG. 4, radio module 3 is held in place and disposed against an inner volume 26 at least partially defined by retaining feature 2, receiving wall surface 16 of rear wall 20, and sidewalls 17. The configuration example shown in FIG. 4 comprises the retaining feature 2 disposed in the internal volume 26 and partially covering the positioning device comprising radio module(s) 3. The configuration shown in FIG. 4 comprises the retaining feature 2 extending away from the sidewalls 17, with the retaining feature 2 having a size and shape to receive and carry the module(s) 3 such that accessory device 1 enables positioning device(s) with more than one radio module(s) 3 inside. The accessory device 1 also includes a rear surface 21 as a means to attach and carry an adhesive element 22 to attach accessory device 1 to package 4.

Figure 5:
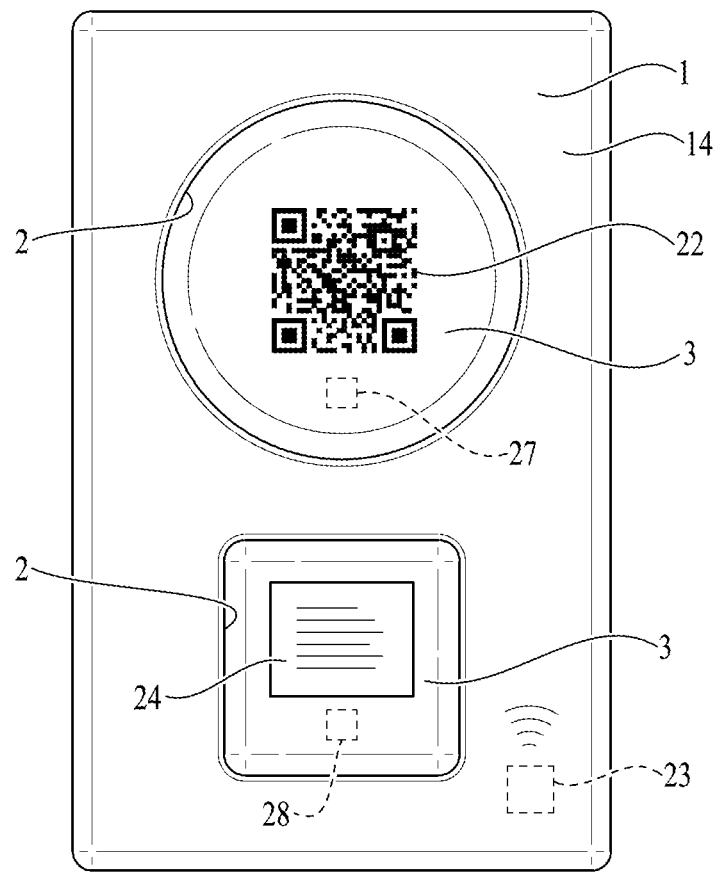
FIG. 5 illustrates a front elevation view of a particular exemplary embodiment of the accessory device of FIG. 1 where a barcode, QR code or other machine readable indicia is incorporated into the module and that further includes a visible or embedded near field communication module (NFC), such as a tag.

FIG. 5 shows accessory device 1 in front elevation view according to a further exemplary embodiment. Accessory device 1 includes a radio module 3 held in the retaining feature 2, that in this example, retains the radio module 3 inside accessory device 1 with further optional means to receive or pre-place a barcode, QR code or other visual indicia code 22 on a front or back side of radio module 3 or alternatively, if such barcode or indicia is on front side, further making it visible through an opening in retaining feature 2. Barcode, QR code or other visual indicia code 22 serves as a computer/machine readable surface to visually capture and identify accessory device 1 to then electronically initiate a communication linkage and/or associate one or more module(s) 3 to package 4 by the unique digital identifier data of barcode, QR code or other visual indicia code 22 read by, for example, a camera of a mobile communication device 6 and/or computer system shown (A) in FIG. 1 so it may be decoded by a remote computer system (A), or, alternatively, to open an app from a mobile phone or communications device(s) to connect accessory device 1 and/or module(s) 3 to a computer system to then monitor the package 4.

Alternatively, a temperature data logger and/or monitor may also be integrated as one modules 3 of the accessory device 1 and may be used, for example, with a package with vaccine shipments. Such temperature (or other) data loggers are typically small electronic devices that contain an internal thermometer (or other sensor or sensors) to record temperature or other readings over a defined period of time. Package temperature (or other parameter) readings and are especially beneficial in cold-chain monitoring to confirm efficacy of packaged products. Such data logger devices are manufactured by firms such as Parsyl™, Logmore™ or others, and may, as illustrated in FIG. 5, include an electronically updateable LCD or e-paper display technology screen 24 on their front side area for displaying an electronically changeable QR code, bar code or other indicia pattern 22 thereon that may be read by a mobile communication device with a camera and/or other optical scanning devices to report monitored in-transit condition data to include: temperature, humidity, light and shocks by reading the scan and/or recorded data.

Further, a module 3 in accessory device 1 may further require authentication or activation for use as intended for package(s). When a user's electronic device such as a mobile phone with a near field communication (NFC) radio module as a short-range radio module is within range, the electronic device can identify NFC module or tag 23 on accessory device, and initialize an authentication or an activation event for the package automatically. The activation may include a near field communications (NFC) module or tag 28 to activate the one or more module(s) 3 held in a retaining feature 2 (i.e., individually, together or in bulk) and/or to associate the module(s) by mobile communication device(s), or by computer system (as shown in FIG. 1), to be activated or combined when tag is read by launching a mobile device application and/or link to mobile app that can then begin monitoring a specific package and/or device(s). Such NFC module 27 may also be embedded into a module 3 or separately applied onto accessory device 1 frame member 14, such as NFC module 23.

FIGS. 6A-B illustrate front and rear perspective views of another alternative embodiment of accessory device 1. In FIG. 6A, accessory device 1 is shown in front view on package 4, wherein module 3 is hidden from front view in retaining feature 2 with electronic module 3 being against the front and sidewalls of the housing member 21 of accessory device 1. In this view, accessory device 1 has a single module 3 docked therein that contains at least two or more radio modules (e.g., a Bluetooth and Ultra-wideband radio module) which are combined into one positioning device using the at least two combined radio modules integrated inside such module 3. Module 3 is held in place with retaining feature 2 of the housing member 21 of accessory device 1 and is adapted to be attached to package 4 by adhesive means 22. Such alternative allows the accessory device 1 to fully cover the module(s) 3 from front view for additional physical protection to prevent impact damage during package transport. Accessory device 1 may be adapted in a manner that makes it water resistant and hidden from view by covert means to hide and obfuscate modules 3 in the accessory device 1. As seen, adhesive means 22 may be an adhesive layer coupled to the wall adjacent to the surface of package 4 to secure the accessory device 1 to the outside or internal wall surfaces of package 4. FIG. 6B shows a rear perspective view where electronic module 3 may be inserted to be retained within side walls of accessory device 1 comprising retaining feature 2.

Figure 7A:
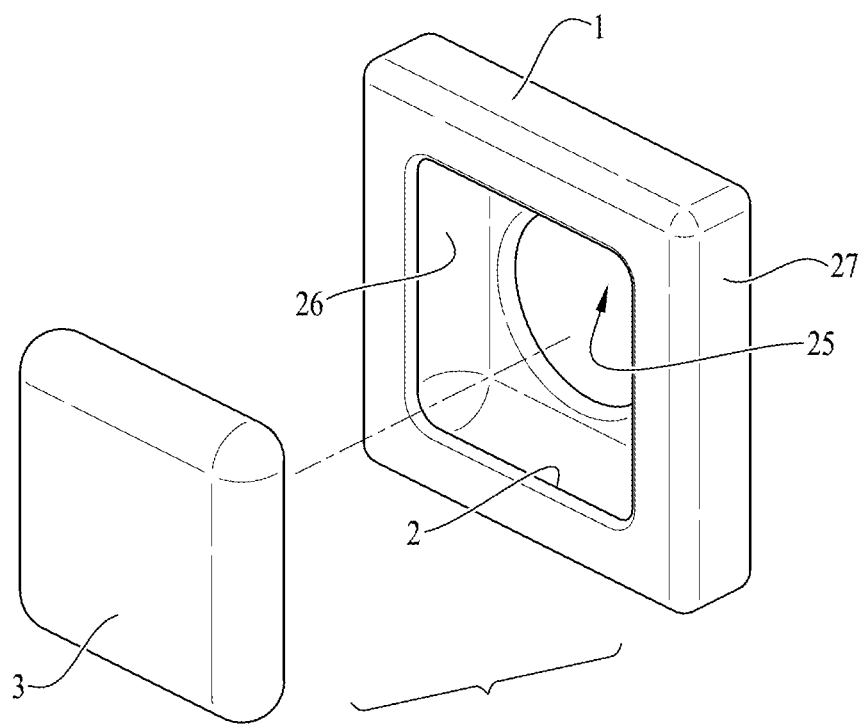
FIGS. 7A-B illustrate front and rear perspective views of a single positioning device according to a further exemplary embodiment of the disclosed concept, with at least two radio modules integrated therein for location monitoring and secured into a retaining frame by sidewalls for placement on or in a package.
Figure 7B:
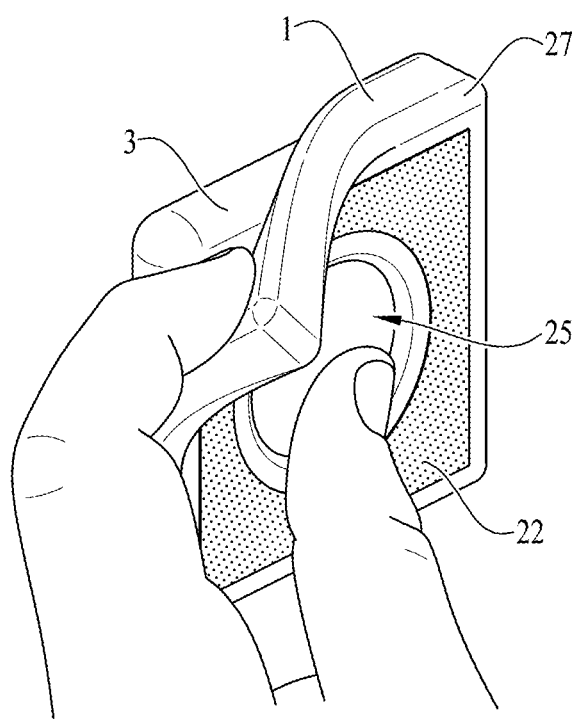

FIGS. 7A-B illustrate front and rear perspective views showing still another alternate embodiment of accessory device 1. Specifically, FIG. 7A shows a front perspective view with a retaining feature 2 designed to hold a single electronic module 3 as a positioning device of accessory device 1, further enlarged to show the retaining feature 2, a recessed region 26, and an optional small cut-out opening 25 in the rear side so as to allow alternative larger sized module(s) 3 to be housed. As seen in FIG. 7B, which shows a rear perspective view, this alternative accessory device 1 comprises an example flexible form factor protective housing member 27 made of a flexible silicone or polymer material formed as a single piece element to retain radio module(s) 3 with stiffness to cover and retain module 3 that defines and conforms to the size and shape corresponding to the electronic module 3 housed therein. In this embodiment, the retaining feature 2 for housing member 27 is capable of carrying the radio module(s) 3 inside when inserted therein and disposed against the sidewalls and rear receiving surface of the housing member 27. As noted above, housing member 27 includes opening 25, beginning after retaining feature 2 ends and/or in the rear wall of housing member 27, which serves as an access point for hand insertion or removal of module 3 into accessory device 1, with the accessory device 1 being further adapted to receive an optional adhesive layer 22 on the outer surface of housing member 27 as an attachment means for accessory device 1 to facilitate accessory device 1 being attached to, adhered to or placed within package(s) 4.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An accessory device structured to be associated with a package, comprising:
   a positioning device including at least two wireless radio modules structured and configured to obtain and/or monitor an indoor and/or outdoor geographic location and/or a temperature condition of the package for use in connection with the package when the package is in-process of being delivered, stored, or being prepared for, staged for, or in-transit of delivery; and
   a housing member structured to hold the positioning device, the housing member comprising:
   a first wall that defines a receiving surface for receiving the positioning device such that the positioning device is disposed against the receiving surface;
   a number of sidewalls extending from, and combining with, the first wall to form an internal volume for the positioning device;
   a retaining feature coupled to the sidewalls of the housing member, the retaining feature being capable of carrying and securing the positioning device within the internal volume; and
   an adhesive layer structured to permit the accessory device to be adhered to the package while the positioning device is retained in the internal volume by the retaining feature, the adhesive layer being provided on either a surface of the first wall that is opposite the retaining surface or a surface of a second wall separate from and opposite to the first wall.

2. The accessory device of claim 1, wherein the at least two wireless radio modules comprise a Bluetooth module and an Ultra-wideband module, both integrated and combined into the positioning device to form a single combined electronic module to be disposed against the receiving surface of the accessory device.

3. The accessory device of claim 1, wherein the at least two wireless radio modules comprise a separate Bluetooth module and separate Ultra-wideband module, integrated as physically separate modules into the accessory device retaining feature.

4. The accessory device of claim 1, wherein an additional temperature condition module separate from the positioning device is further added to and held by a second retaining feature of the housing member of the accessory device, wherein the at least two wireless radio modules comprise a Bluetooth module and/or an Ultra-wideband module, or a combination of the two, integrated into the positioning device.

5. The accessory device of claim 1, wherein the housing member is made of one of a silicone, polymer, elastomeric, plastic, paper or cardboard material and/or a combination thereof.

6. The accessory device of claim 1, wherein the retaining feature further comprises a partial covering for the positioning device with a stiffness and bending flexibility allowing for the physical hand insertion and/or removal of positioning device within the housing member to facilitate removal of the positioning device from the housing member.

7. The accessory device of claim 1, wherein receiving surface has a circular, square or rectangular shape.

8. The accessory device of claim 1, wherein the retaining feature may be co-planar with an opening(s) in one or more interior region of the accessory device such that the accessory device is held within and not disturbed when positioned into the accessory device and further, may be hidden to protect electronic module(s) inserted into accessory device to protect from physical damage during package shipment.

9. The accessory device of claim 1, wherein the adhesive layer includes a tear-away backing.

10. The accessory device of claim 1, wherein the housing member comprises an opening designed to attach the accessory device to the package, wherein the opening is structured to receive a flexible attachment strap or loop made of plastic, silicone, string or metallic material to secure the accessory device to the package.

11. The accessory device of claim 1, wherein the package is airline baggage and the accessory device functions as an electronic baggage tag.

12. The accessory device of claim 1, further comprising a barcode, QR code or other machine readable indicia provided on an outer surface of the positioning device accessible through an opening in the retaining feature to identify and electronically associate the positioning device to the package.

13. The accessory device of claim 1, further including a near field communications (NFC) module to activate one or more of the at least two wireless radio modules and/or to associate the at least two wireless radio modules by a unique identifier with package.

14. The accessory device of claim 1, wherein the accessory device further comprises an electronic data logger as a temperature condition module that tracks or monitors package condition data, including temperature(s), that may be accessed by wireless devices and/or by non-wireless transmission means by a barcode in a form of a QR code or other visual indica displayed on an electronic display screen of the data logger.

15. The accessory device of claim 1, wherein the accessory device further comprises one or more of computer readable codes or indicia that is added to the positioning device and/or the accessory device to associate or pair the positioning device to the package for a specific shipment or delivery itinerary by a common carrier after reading the computer readable code or indicia.

16. The accessory device of claim 1, wherein the accessory device is configured for use in connection with a vaccine or other pharmaceutical package in-process of being, delivered, stored, or being prepared for, staged for or in-transit.

17. The accessory device of claim 1, further comprising an opening provided through the first wall.

18. An accessory device structured to be associated with a package, comprising:
- at least two wireless radio modules contained inside a single positioning device to obtain and/or monitor an indoor and/or outdoor geographic locations and/or a temperature condition(s) of the package for use in connection with the package when the package is in-process of being delivered, stored, or being prepared for, staged for, or in-transit of delivery, and
- a housing member structured to hold the positioning device, the housing member comprising:
- a protective housing member made of at least one of flexible silicone, elastomeric, plastic or polymer material formed as a single piece element to cover and retain the positioning device that defines and conforms to a size and shape corresponding to the at least two wireless radio modules;
- wherein the housing member includes a retaining feature capable of carrying and securing the positioning device within an internal volume of the positioning device formed by sidewalls and a rear wall of the housing member, the positioning device being inserted and disposed against the sidewalls and rear wall of the housing member, and wherein the housing member further includes a front and/or a rear opening beginning where the retaining feature ends and/or in the rear wall, serving as an access point for hand insertion of the positioning device into the accessory device or removal of the positioning device from the accessory device; and
- an adhesive retaining layer provided on an outer surface of the rear wall for attaching the accessory device onto surface of a package.

19. The accessory device of claim 18, wherein the at least two wireless radio modules comprise a Bluetooth module and an Ultra-wideband module, both integrated and combined into the positioning device to form a single combined electronic module to be disposed against the sidewalls and rear wall of the housing member.

20. The accessory device of claim 18, wherein the rear wall includes a receiving surface for engaging the positioning device, the receiving surface shape having a circular, square or rectangular shape which matches a shape of the positioning device.

21. The accessory device of claim 18, wherein the adhesive retaining layer is a replaceable or exchangeable layer.

\* \* \* \* \*